US008867962B2

(12) United States Patent
He

(10) Patent No.: US 8,867,962 B2
(45) Date of Patent: Oct. 21, 2014

(54) DRIVING COMPONENT, PHOTOSENSITIVE DRUM AND PROCESS CARTRIDGE

(75) Inventor: Zhiya He, Guangdong (CN)

(73) Assignee: Print-Rite•Unicorn Image Products Co., Ltd. of Zhuhai, Zhuhai, Guangdong (CN)

( * ) Notice: Subject to any disclaimer, the term of this patent is extended or adjusted under 35 U.S.C. 154(b) by 730 days.

(21) Appl. No.: 13/128,058

(22) PCT Filed: Jun. 7, 2010

(86) PCT No.: PCT/CN2010/073609
§ 371 (c)(1),
(2), (4) Date: May 6, 2011

(87) PCT Pub. No.: WO2010/145467
PCT Pub. Date: Dec. 23, 2010

(65) Prior Publication Data

US 2011/0217073 A1 Sep. 8, 2011

(30) Foreign Application Priority Data

Jun. 16, 2009 (CN) ...................... 2009 2 0058935 U

(51) Int. Cl.
*G03G 15/00* (2006.01)
*F16H 33/00* (2006.01)
*G03G 21/18* (2006.01)
*G03G 21/16* (2006.01)

(52) U.S. Cl.
CPC ...... *G03G 21/186* (2013.01); *G03G 2221/1657* (2013.01); *G03G 21/1647* (2013.01); *G03G 15/757* (2013.01)
USPC ............................................ 399/167; 74/640

(58) Field of Classification Search
USPC ............................ 399/111, 116, 167; 74/640
See application file for complete search history.

(56) References Cited

U.S. PATENT DOCUMENTS

| | | | | |
|---|---|---|---|---|
| 4,829,335 | A | 5/1989 | Kanemitsu et al. | |
| 5,903,803 | A | 5/1999 | Kawai et al. | |
| 2006/0078352 | A1 | 4/2006 | Jang et al. | |
| 2008/0152388 | A1* | 6/2008 | Ueno et al. | 399/167 |
| 2008/1015238 | | 6/2008 | Ueno et al. | |
| 2009/0060578 | A1 | 3/2009 | Oohara et al. | |

FOREIGN PATENT DOCUMENTS

| | | | |
|---|---|---|---|
| CN | 1892476 | A | 1/2007 |
| CN | 201174031 | Y | 12/2008 |
| CN | 201174032 | Y | 12/2008 |
| CN | 201434968 | Y | 3/2010 |

OTHER PUBLICATIONS

International Search Report dated Jul. 6, 2010.

* cited by examiner

*Primary Examiner* — David Gray
*Assistant Examiner* — Erika J Villaluna
(74) *Attorney, Agent, or Firm* — Cozen O'Connor

(57) ABSTRACT

The present invention provides a driving component, a photosensitive drum and a process cartridge. The driving component comprises a gear having one fixed end and a regulating component having a rotational driving force receiver outside the other end projecting from the gear. The regulating component is provided within the gear by being moved reciprocally and translationally along the gear's longitudinal direction and a first direction perpendicular to the longitudinal direction relative to the gear. A spring support part and a longitudinal position limit part are provided between the regulating component and the gear. The rotational driving force receiver is provided inside the regulating component by rotating around its own axis. Compared to the existing technology, the process cartridge using this driving component has a smooth engagement with a printer, reliable performance and stable work.

13 Claims, 9 Drawing Sheets

DRIVING COMPONENT, PHOTOSENSITIVE DRUM AND PROCESS CARTRIDGE

CROSS-REFERENCE TO RELATED APPLICATIONS

This application claims priority from international application No. PCT/CN2010/073609 filed on Jun. 7, 2010, which claims priority from Chinese Patent Application Number 200920058935.X filed on Jun. 16, 2009. These applications are incorporated herein by reference.

FIELD OF THE INVENTION

The present invention relates to a driving component, a photosensitive drum and a processing cartridge using the driving component.

BACKGROUND OF THE INVENTION

An electrophotographic image forming apparatus includes a copying machine, a laser printer and other similar devices.

Usually there is a process cartridge in the electrophotographic image forming apparatus. The process cartridge can be mounted to a main assembly of the electrophotographic image forming apparatus and be demounted from the main assembly. For example, the process cartridge is prepared by integrally assembling a photosensitive drum and at least one of a developing means, a charging means, and a cleaning means as the processing means into a cartridge.

Current process cartridges include the following types: a first type of a process cartridge prepared by integrally assembling a photosensitive drum, and a developing means, a charging means and a cleaning means into a cartridge; a second type of a process cartridge prepared by integrally assembling a photosensitive drum and a charging means into a cartridge; and a third type of a process cartridge prepared by integrally assembling a photosensitive drum and two processing units consisting of a charging means and a cleaning means.

A user can mount the above process cartridge to the main assembly of an electrophotographic image forming apparatus in a detachable way. Therefore, the user can maintain the apparatus without relying on a service person. As a result, the user's operability of the maintenance of the electrophotographic image forming apparatus is improved. In the above conventional process cartridge, the mechanism used for receiving a rotational driving force from an apparatus main assembly to rotate a photosensitive drum is described as follows.

On a main assembly side, a rotatable member for transmitting a driving force of a motor and a non circular twisted hole, which is provided at a center portion of the rotatable member and has a cross section integrally rotatable with the rotatable member and provided with a plurality of corners, are provided.

On a process cartridge side, a non circular twisted projection, which is provided at one of longitudinal ends of a photosensitive drum and has a cross section provided with a plurality of corners, is provided. When the rotatable member is rotated in an engaged state between the projection and the hole in the case where the process cartridge is mounted to the apparatus main assembly, a rotational driving force of the rotatable member is transmitted to the photosensitive drum. As a result, the rotational force for driving the photosensitive drum is transmitted from the apparatus main assembly to the photosensitive drum. Another known mechanism is to drive a photosensitive drum by engaging a gear fixed to the photosensitive drum thus to drive a process cartridge consisting of the photosensitive drum.

However, in the conventional constitution described in U.S. Pat. No. 5,903,803, the rotatable member is required to be moved in a horizontal direction when the process cartridge is mounted to or demounted from the main assembly by being moved in a direction substantially perpendicular to an axial line of the rotatable member. That is, the rotatable member is required to be horizontally moved by an opening and closing operation of a main assembly cover. By the opening operation of said main assembly cover, the hole is separated from the projection. On the other hand, by the closing operation of the main assembly cover, the hole is moved toward the projection so as to be engaged with the projection. Accordingly, in the conventional process cartridge, a mechanism for moving the rotatable member in a rotational axis direction by the opening and closing operation of the main assembly cover is required to be provided to the main assembly. In the constitution described in U.S. Pat. No. 4,829,335, without moving the driving gear provided to the main assembly along the axial line direction thereof, the cartridge can be mounted to and demounted from the main assembly by being moved in a direction substantially perpendicular to the axial line. However, in this constitution a driving connection portion between the main assembly and the cartridge is an engaging portion between gears, so that it is difficult to prevent rotation non uniformity of the photosensitive drum.

U.S. Pat. App. Pub. No. US2008/0152388A1 discloses another type of the process cartridge. The improvement compared to the above process cartridge is to use a spherically universal joint driving-coupling structure as a driving component located at a longitudinal end of a photosensitive drum. This driving-coupling structure is easily disengaged from the driving component. Especially during a transportation process, this phenomenon occurs more easily, which causes the driving component to lose function and work unstably.

SUMMARY OF THE INVENTION

An object of the present invention is to provide a driving component with improved structure and reliable performance.

Another object of the present invention is to provide a photosensitive drum comprising the driving component with improved structure and reliable performance.

A further object is to provide a process cartridge comprising the driving component with improved structure and reliable performance.

In order to achieve one or more of the above objects, a driving component provided in the present invention comprises a gear having one fixed end and a regulating component having a rotational driving force receiver outside the other end projecting from said gear. Said regulating component is provided within the gear by being moved reciprocally and translationally along the longitudinal direction of said gear and a first direction perpendicular to the longitudinal direction relative to said gear. A spring support part and a longitudinal position limit part are provided between said regulating component and said gear. Said rotational driving force receiver is provided inside said regulating component by rotating around its own axis.

A further plan is to provide said regulating component comprising a motion subassembly and a regulating rod. Said regulating rod has a chute. Said motion subassembly is provided within said chute by being moved reciprocally and translationally along a second direction perpendicular to the longitudinal direction of said gear relative to said regulating rod. Said second direction intersects with the projection of said first direction on the same radial plane of said gear.

A further plan is to provide said motion subassembly comprising said rotational driving force receiver and a regulating slider. Said rotational driving force receiver can be rationally connected to said regulating slider around its own axis. A rotation limiting pin is provided between said rotational driving force receiver and said regulating slider.

A further plan is to provide said rotational driving force receiver comprising an outer end portion, a middle portion and a shaft portion on which a pinhole allowing said rotation limiting pin to pass through is provided. A concave spherical surface is formed at the center position of said outer end portion. A first convex claw and a second convex claw projecting longitudinally, and a first section and a second section separated by the first convex claw and the second convex claw are formed around the circumference of the spherical surface. The surface of said first convex claw has a first engaged surface, a first bevel and a second bevel; and the surface of said second convex claw has a second engaged surface, a third bevel and a fourth bevel, in which the first bevel, the second bevel, the third bevel and the fourth bevel are all formed around the circumferential edge of said outer end portion.

A further plan is to provide that said first convex claw and said second convex claw, and said first section and said second section are centrally symmetric to the axis of the rotational driving force receiver, respectively.

A further plan is to provide said regulating slider comprising a base and a boss formed on the base. A through hole penetrating longitudinally is provided inside the boss. The diameter of the through hole is larger than the diameter of the shaft portion of said rotational driving force receiver but smaller than the diameter of the middle portion of said rotational driving force receiver. A first side of said base has a first position limit protrusion protruding outward and said second side has a second position limit protrusion protruding outward. The bottom of said base has a recess accommodating said rotation limiting pin. The recess is formed around the circumference of said through hole. A first position limit block and a second position limit block are provided oppositely inside the recess.

In addition, the outer peripheral surface of said gear has a transmission tooth ring. A divisional plate perpendicular to the longitudinal direction and a gear cavity above the divisional plate are provided inside the gear. The center position of the divisional plate has opened a position limit hole. A number of bars projecting longitudinally are uniformly distributed on the circumferential wall of the gear cavity. Said regulating rod comprises a top, a rod and an elastic clip, referred to below as a "circlip", in which a pair of free ends are snapped into holes. The top has a chute penetrating in a radial direction and said position limit bottom is fixed on the circlip. Said position limit bottom is located inside of said divisional plate. Said top is located outside of said divisional plate. Said rod passes through said position limit hole. The width of the position limit hole is substantially equal to the width of the cross section of said rod, and the length of the position limit hole is larger than the length of the rod's cross section.

A photosensitive drum provided in the present invention comprises a main drum body and a driving component fixed at a longitudinal end of said main drum body. Said driving component comprises a gear having one fixed end and a regulating component having a rotational driving force receiver outside the other end projecting from said gear. Said regulating component is provided within the gear by being moved reciprocally and translationally along the longitudinal direction of said gear and a first direction perpendicular to the longitudinal direction relative to said gear. A spring support part and a longitudinal position limit part are provided between said regulating component and said gear. Said rotational driving force receiver is provided inside said regulating component by rotating around its own axis.

A further plan is to provide a regulating component comprising a motion subassembly and a regulating rod. Said regulating rod has a chute. Said motion subassembly is provided within said chute by being moved reciprocally and translationally along a second direction perpendicular to the longitudinal direction of said gear relative to said regulating rod. Said second direction intersects with the projection of said first direction on the same radial plane of said gear.

A further plan is to provide said motion subassembly comprising said rotational driving force receiver and a regulating slider. Said rotational driving force receiver can be rationally connected to said regulating slider around its own axis. A rotation limiting pin is provided between said rotational driving force receiver and said regulating slider.

A further plan is to provide said rotational driving force receiver comprising an outer end portion, a middle portion and a shaft portion on which a pinhole allowing said rotation limiting pin to pass through is provided. A concave spherical surface is formed at the center position of said outer end portion. A first convex claw and a second convex claw projecting longitudinally, and a first section and a second section separated by the first convex claw and the second convex claw are formed around the circumference of the spherical surface. The surface of said first convex claw has a first engaged surface, a first bevel and a second bevel; and the surface of said second convex claw has a second engaged surface, a third bevel and a fourth bevel, in which the first bevel, the second bevel, the third bevel and the fourth bevel are all formed around the circumferential edge of the outer end portion.

A process cartridge provided in the present invention comprises a cartridge and a photosensitive drum assembled rotationally inside said cartridge. Said photosensitive drum comprises a main drum body and a driving component fixed at a longitudinal end of said main drum body. Said driving component comprises a gear having one fixed end and a regulating component having a rotational driving force receiver outside the other end projecting from said gear. Said regulating component is provided within the gear by being moved reciprocally and translationally along the longitudinal direction of said gear and a first direction perpendicular to the longitudinal direction relative to said gear. A spring support part and a longitudinal position limit part are provided between said regulating component and said gear. Said rotational driving force receiver is provided inside said regulating component by rotating around its own axis.

A further plan is to provide a regulating component comprising a motion subassembly and a regulating rod. Said regulating rod has a chute. Said motion subassembly is provided within said chute by being moved reciprocally and translationally along a second direction perpendicular to the longitudinal direction of said gear relative to said regulating rod. Said second direction intersects with the projection of said first direction on the same radial plane of said gear.

A further plan is to provide said motion subassembly comprising said rotational driving force receiver and a regulating slider. Said rotational driving force receiver can be rationally connected to said regulating slider around its own axis. A rotation limiting pin is provided between said rotational driving force receiver and said regulating slider.

A further plan is to provide said rotational driving force receiver comprising an outer end portion, a middle portion and a shaft portion on which a pinhole allowing said rotation limiting pin to pass through is provided. A concave spherical surface is formed at the center position of said outer end portion. A first convex claw and a second convex claw projecting longitudinally, and a first section and a second section separated by the first convex claw and the second convex claw are formed around the circumference of the spherical surface. The surface of said first convex claw has a first engaged surface, a first bevel and a second bevel; and the surface of said second convex claw has a second engaged surface, a third bevel and a fourth bevel, in which the first bevel, the second bevel, the third bevel and the fourth bevel are all formed around the circumferential edge of the outer end portion.

DETAILED DESCRIPTION OF THE PRESENTLY PREFERRED EMBODIMENTS

The process cartridge in the present invention is identical to various types of the current process cartridges described in Background Art of the present patent application. The photosensitive drum of the present invention is identical to those published in the current literature. The only difference is the driving component constructed at the longitudinal end of the photosensitive drum. Thus, only the embodiment of the driving component is described in detail as follows. Other embodiments related to the process cartridge and the photosensitive drum are not described herein.

Figure 1:
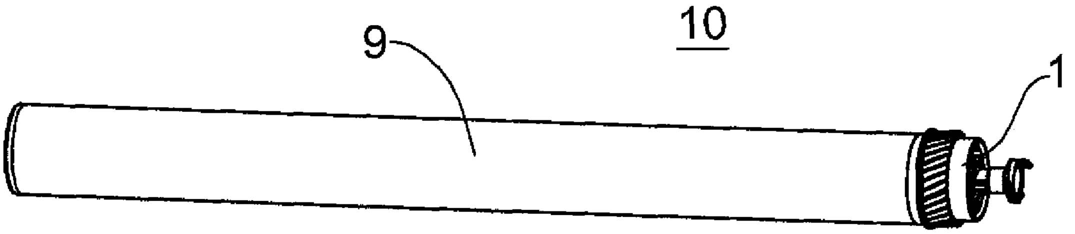
FIG. 1 is a perspective view illustrating one embodiment of a photosensitive drum.

FIG. 1 shows an embodiment of a photosensitive drum 10 constituting a driving component 1 in the present invention. The driving component 1 is fixed at one end of a main drum body 9 of the photosensitive drum 10. The main drum body 9 has a photosensitive layer at its peripheral surface. The driving component 1 is used to receive a rotational driving force from a printer's driving mechanism and transmit the rotational driving force to the main drum body 9. The main drum body 9 rotates around its axis under the rotational driving force.

Figure 2:
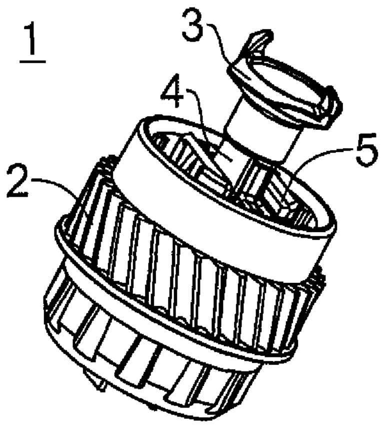
FIG. 2 is a perspective view illustrating one embodiment of a driving component shown in FIG. 1.
Figure 3:
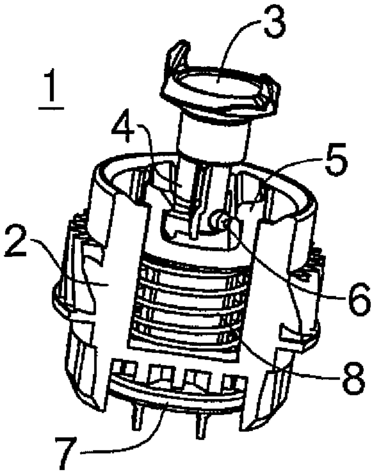
FIG. 3 is a perspective view in partial cut-away of the driving component shown in FIG. 2.
Figure 4:
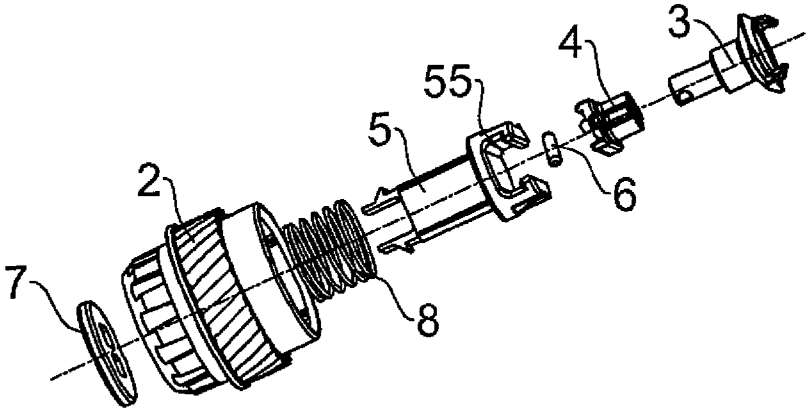
FIG. 4 is an exploded view of the driving component shown in FIG. 2.

FIGS. 2-4 show the basic constructions of the driving component 1, which mainly comprises a gear 2, a rotational driving force receiver 3, a regulating slider 4, a regulating rod 5, a rotation limiting pin 6, a position limit bottom 7 and a helical compression spring 8. The gear 2 is fixed at one end of the main drum body 9. The axis of the gear 2 coincides with the axis of the main drum body 9. The gear 2 rotates synchronously with the main drum body 9 around their common axis. The rotational driving force receiver 3 is connected to the regulating slider 4 through the rotation limiting pin 6. The rotational driving force receiver 3 can rotate reciprocally around its axis within a certain angular range relative to the regulating slider 4. The top of the regulating rod 5 has a chute 55 in which the regulating slider 4 can reciprocally slide relative to the regulating rod 5. The helical compression spring 8 is set on the regulating rod 5. The regulating rod 5 is assembled inside the gear 2 through the position limit bottom 7.

A regulating component 11 comprises a rotational driving force receiver 3, a regulating slider 4, a rotation limiting pin 6 and a regulating rod 5. Referring to FIGS. 19*a*-19*c*, the regulating component 11 can make a limited longitudinal and reciprocally translational movement along the photosensitive drum's longitudinal direction Z relative to the gear 2 via the compression of the helical compression spring 8 and the position limit from the position limit bottom 7. Again, referring to FIGS. 16, 17 and 18*a*-18*c*, the regulating component 11 can make a limited first straight line reciprocally translational movement along the first direction X perpendicular to the photosensitive drum's longitudinal direction Z relative to the gear 2. The movement is achieved inside a drum shaped hole 22 of the gear 2. In addition, referring to FIGS. 13-17, a motion subassembly 12 comprising a rotational driving force receiver 3, a regulating slider 4 and a rotation limiting pin 6 can make a limited second straight line reciprocally translational movement inside the chute 55 along the second direction Y perpendicular to the photosensitive drum's longitudinal direction Z relative to the regulating rod 5. The projections of the first direction X and the second direction Y on the same radial plane of the photosensitive drum 10 are cross-cutting, neither coincident nor parallel. In this embodiment, the first direction X is orthogonal to the second direction Y.

Figure 5:
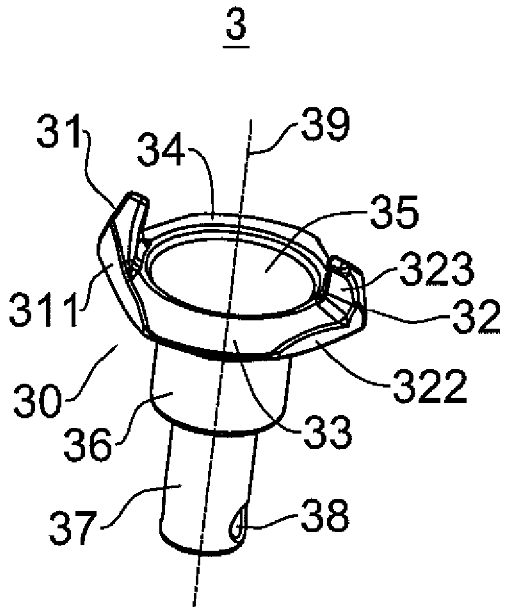
FIG. 5 is a perspective view illustrating a rotational driving force receiver shown in FIG. 4.
Figure 6:
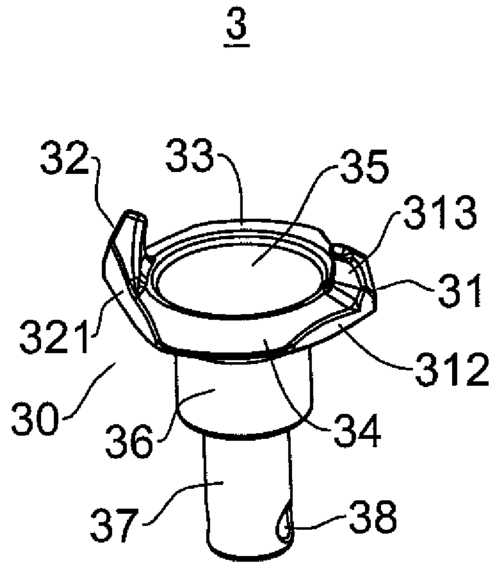
FIG. 6 is a back view of the rotational driving force receiver shown in FIG. 5.

Referring to FIG. 5 and FIG. 6, the rotational driving force receiver 3 is roughly a similar shape of the torch, which comprises an outer end portion 30, a middle portion 36 and a shaft portion 37 tapered from outside to inside (from top to bottom as shown in FIG. 5). The middle portion 36 and the shaft portion 37 are all cylindrical. A pinhole 38 is provided on the shaft portion 37, which allows the rotation limiting pin 6 passes through. A concave spherical surface 35 is formed in the center position of the outer end portion 30. A first convex claw 31 and a second convex claw 32 projecting longitudinally are formed around the circumference of the spherical surface 35. The first convex claw 31 and the second convex claw 32 are centrally symmetric to the axis 39 of the rotational driving force receiver 3. In addition, a first section 33 and a second section 34 separated by the first convex claw 31 and the second convex claw 32 are formed around the circumference of the spherical surface 35 and are also centrally symmetric to the axis 39. The surface of the first convex claw 31 has a first engaged surface 313, a first bevel 311 and a second bevel 312. The surface of the second convex claw 32 has a second engaged surface 323, a third bevel 321 and a fourth bevel 322, in which the first engaged surface 313 and the second engaged surface 323, the first bevel 311 and the third bevel 321, and the second bevel 312 and the fourth bevel 322 are centrally symmetric to the axis 39, respectively. The first bevel 311, the second bevel 312, the third bevel 321 and the fourth bevel 322 are all formed around the circumferential edge of the rotational driving force receiver 3.

Figure 7:
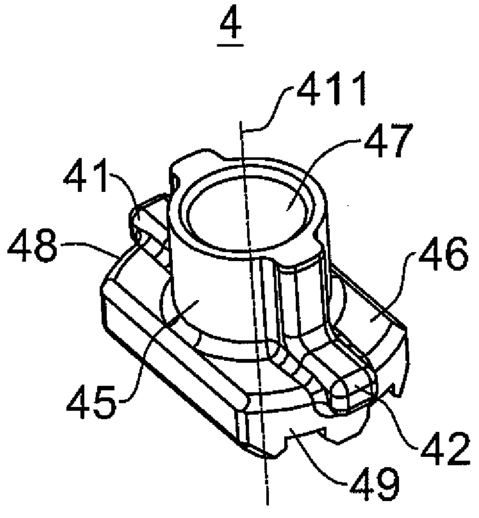
FIG. 7 is a perspective view illustrating a regulating slider shown in FIG. 4.
Figure 8:
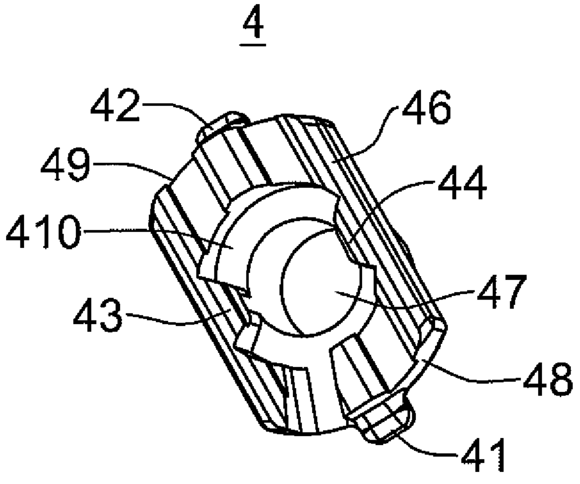
FIG. 8 is a bottom view of the regulating slider shown in FIG. 7.

Referring to FIG. 7 and FIG. 8, a regulating slider 4 comprises a base 46 shaped roughly like a drum and a cylindrical boss 45 formed on the base 46. There is a cylindrical through hole 47 penetrating longitudinally inside the boss 45. The diameter of the through hole 47 is larger than the diameter of the shaft portion 37 of the rotational driving force receiver 3 but smaller than the diameter of the middle portion 36 of the rotational driving force receiver 3. Thus the hole can only allow the shaft portion 37 to pass through. A first side 48 of the base 46 has a first position limit protrusion 41 protruding outward and a second side 49 has a second position limit protrusion 42 protruding outward. The role of the above two position limit protrusions is to control the distance of which the regulating slide 4 moves on the lateral surface inside the chute of the regulating rod. The bottom of the base 46 has a recess 410 accommodating the rotation limiting pin 6. The recess 410 is formed around the circumference of the through hole 47. Two opposite blocks, namely a first position limit block 43 and a second position limit block 44 are provided inside the recess, which allow the rotation limiting pin 6 to be able to and only be able to rotate around the axis 411 of the regulating slider 4 within a certain angular range.

Figure 9:
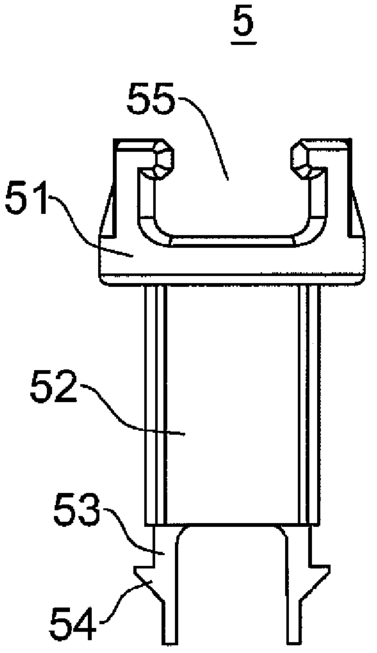
FIG. 9 is a perspective view illustrating a regulating rod shown in FIG. 4.
Figure 10:
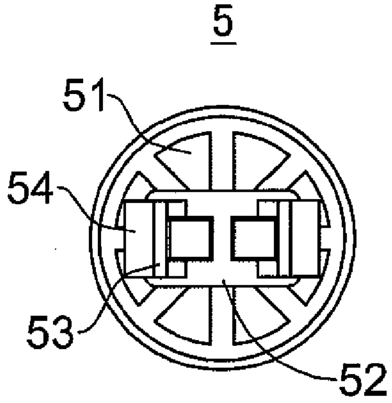
FIG. 10 is a bottom view of the regulating rod shown in FIG. 9.

Referring to FIG. 9 and FIG. 10, the regulating rod 5 comprises a top 51, a rod 52 and a circlip 53. The projection of the top 51 on its radial plane is round. The top 51 has an upper chute 55 penetrating in the radial direction. The cross section of the chute 55 is roughly as “convex” shape. The regulating slider 4 can slide along the radial direction inside the chute 55. The cross section of the rod 52 is a drum shaped. The circlip is roughly “U” shaped on which a claw 54 is formed.

Figure 11:
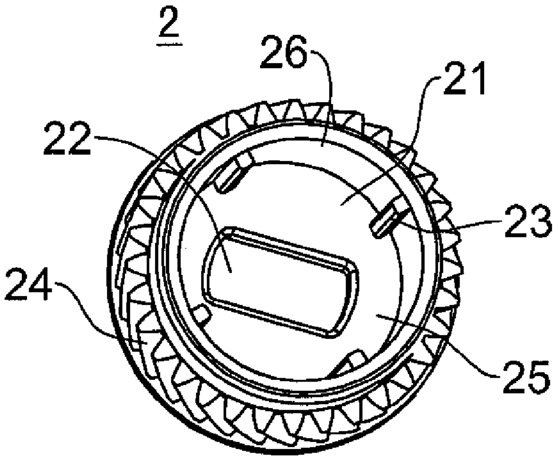
FIG. 11 is a perspective view illustrating a gear shown in FIG. 4.

Referring to FIG. 11, the outer peripheral surface of the gear 2 has a transmission tooth ring 24. A divisional plate 25 perpendicular to the longitudinal direction and a gear cavity 21 above the division 25 are provided inside the gear 2. The center position of the divisional plate 25 has opened a drum shaped hole 22. The width of the drum shaped hole 22 is substantially equal to the cross section’s width of the rod portion 52 of the regulating rod 5. Its length is larger than the cross section’s length of the rod portion 52. A number of bars 23 projecting longitudinally is uniformly distributed on the circumferential wall 26 of the gear cavity 21. The role of the bars 23 is to enforce the inner strength of the gear 2.

Figure 16:
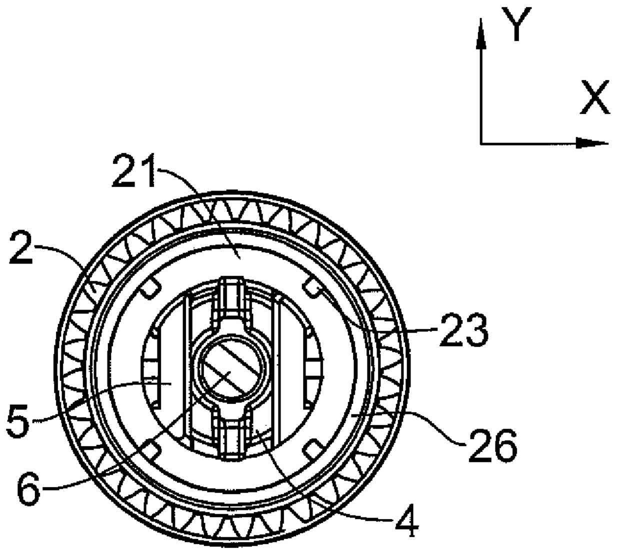
FIG. 16 is an axial view of the driving component from outside inwards, in which the rotational driving force receiver is hidden.
Figure 17:
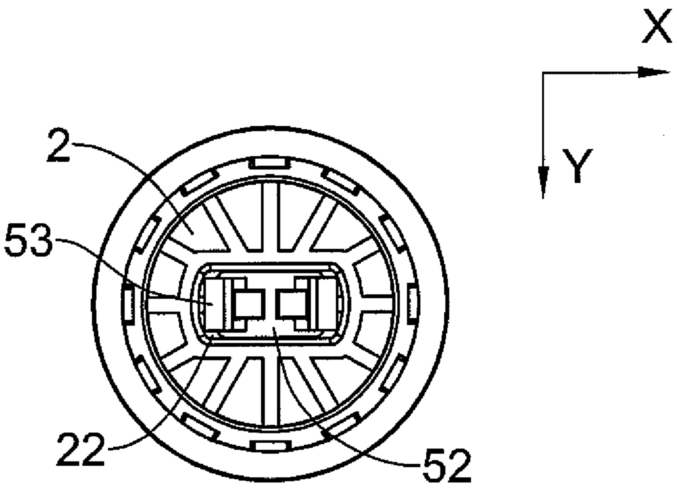
FIG. 17 is an axial view of the driving component from the inside out, in which the position limit bottom is hidden.

Referring to FIG. 16 and FIG. 17, the drum shaped hole 22 can provide the position limit for the first straight line reciprocally transitional movement acted by the regulating component 11 along the direction X while the circumferential wall 26 and the bars 23 of the gear cavity 21 can provide the position limit for the second straight line reciprocally transitional movement acted by the motion subassembly 12 along the direction Y.

Figure 12:
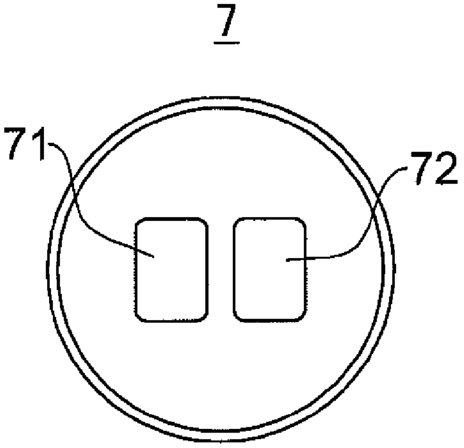
FIG. 12 is a perspective view illustrating a position limit bottom shown in FIG. 4.

Referring to FIG. 12, the position limit bottom 7 is a circular plate and has opened two clip connecting holes 71, 72 that can be adjusted to allow the circlip 53 of the regulating rod 5 to pass through.

Figure 13:
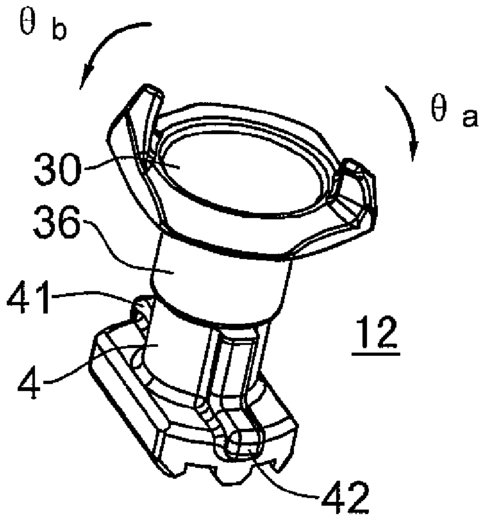
FIG. 13 is a perspective view illustrating a motion subassembly of the driving component shown in FIG. 2.
Figure 14:
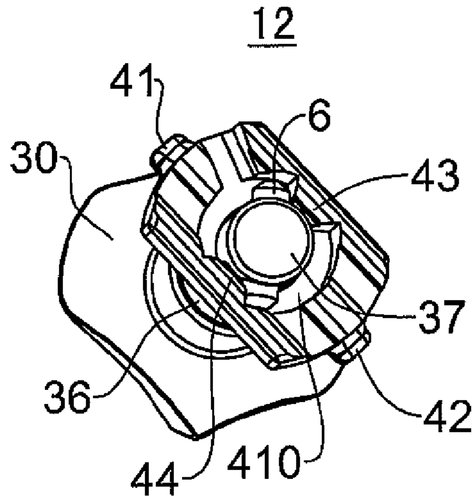
FIG. 14 is a bottom view of the motion subassembly shown in FIG. 13.

Referring to FIG. 13 and FIG. 14, a motion subassembly 12 comprises a rotational driving force receiver 3, a regulating slider 4 and a rotation limiting pin 6. The shaft portion 37 of the rotational driving force receiver 3 penetrates the through hole 47 of the regulating slider 4. The rotation limiting pin 6 passes through the pinhole 38 on the shaft portion 37 and is set inside the recess 410 of the bottom of the regulating slider 4.

Figure 15:
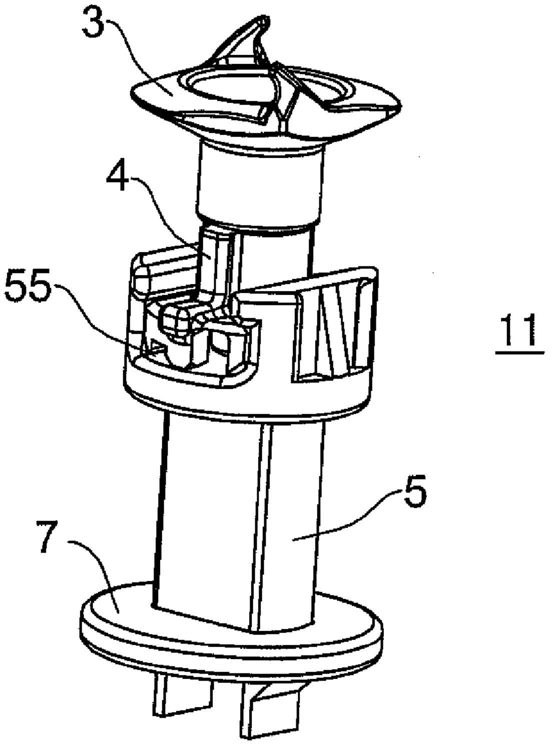
FIG. 15 is a perspective view illustrating a regulating component and a position limit bottom of the driving component shown in FIG. 2.

Referring to FIG. 15, a regulating component 11 comprises a rotational driving force receiver 3, a regulating slider 4, a rotation limiting pin 6, a regulating rod 5 and a position limit bottom 7. The regulating component 11 can make a longitudinal and reciprocally transitional movement along the photosensitive drum’s longitudinal direction Z relative to the gear 2 via compression of the helical compression spring 8 exerted by an external force.

The position relationship between the regulating component 11 and the gear 2 can be more clearly understood through FIG. 16 and FIG. 17. To facilitate understanding, the rotational driving force receiver 3 is omitted in FIG. 16 and the position limit bottom 7 is omitted in FIG. 17.

Figure 18A:
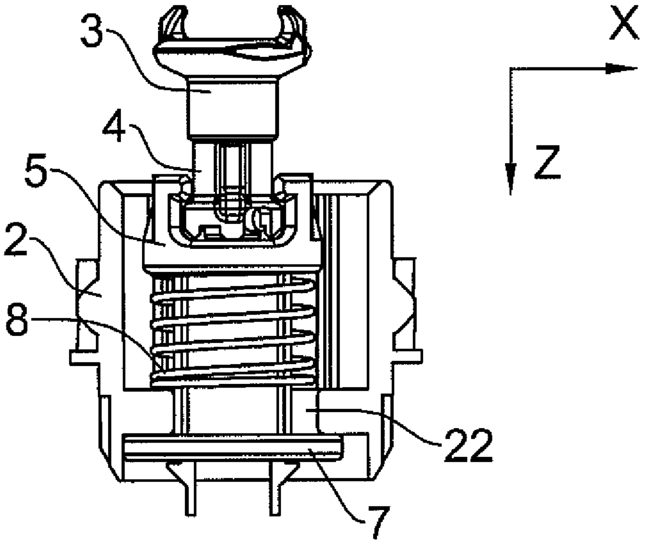
FIGS. 18*a*-18*c* are schematic diagrams illustrating the regulating component's translation in a radial direction relative to the gear as shown in FIG. 15.
Figure 18B:
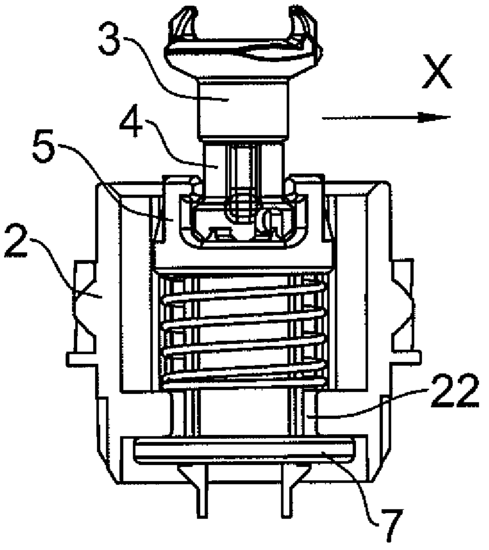
Figure 18C:
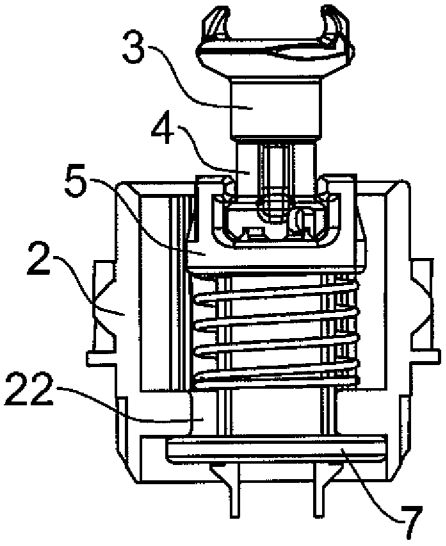
Figure 19A:
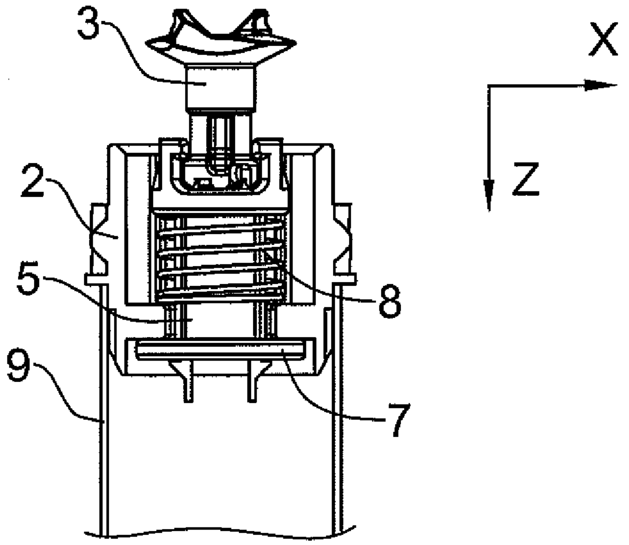
FIGS. 19*a*-19*c* are schematic diagrams illustrating the regulating component's translation in a longitudinal direction relative to the gear as shown in FIG. 15.
Figure 19B:
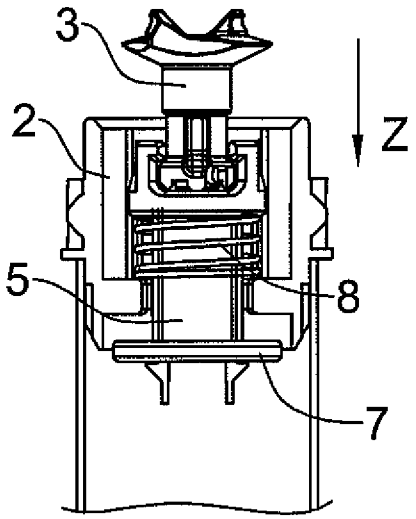
Figure 19C:
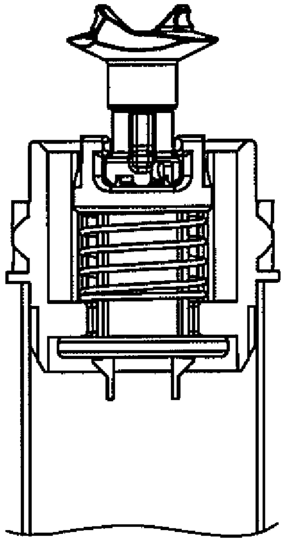
Figure 20A:
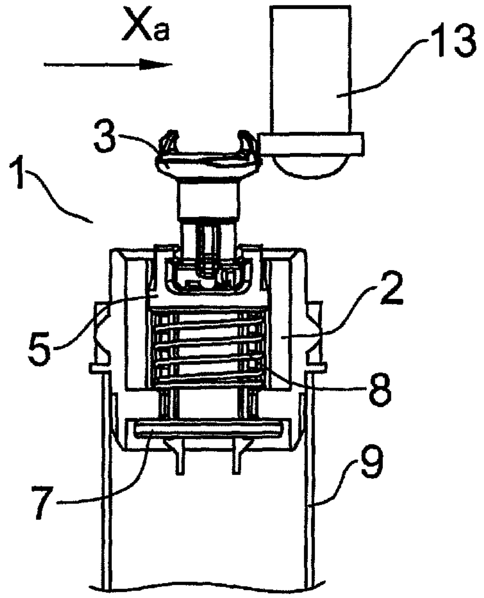
FIGS. 20*a*-20*d* are schematic diagrams illustrating a coordination process of the driving component and a printer's driving head when a process cartridge of the photosensitive drum in one embodiment shown in FIG. 1 is engaged into a printer.
Figure 20D:
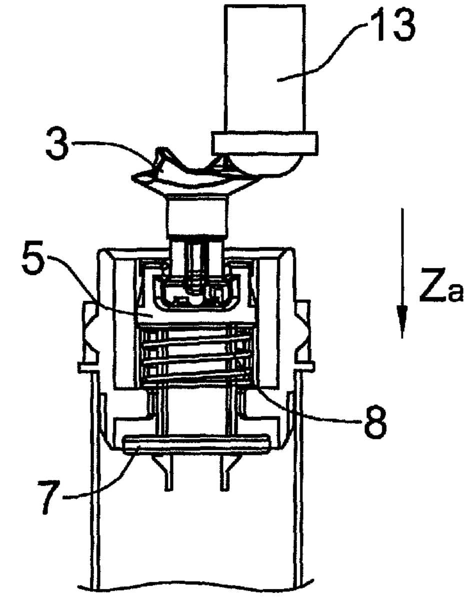
Figure 20B:
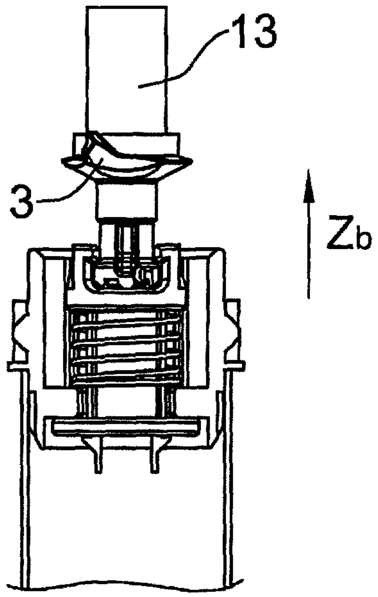
Figure 20C:
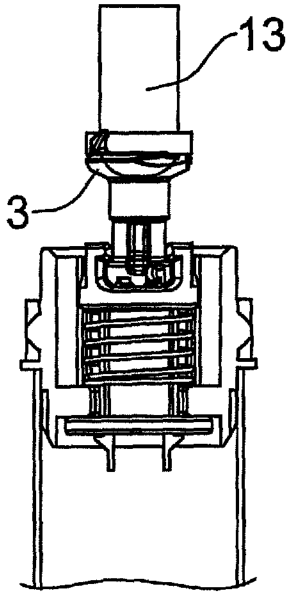
Figure 21A:
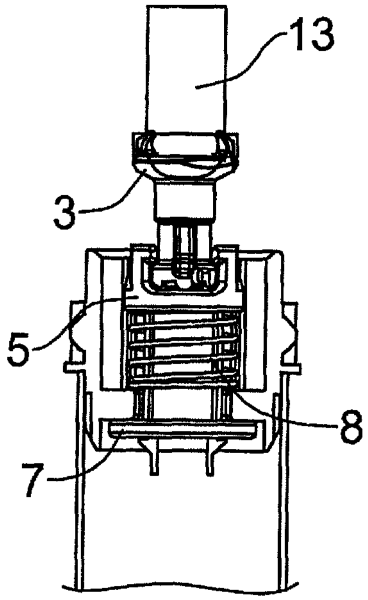
FIGS. 21*a*-21*d* are schematic diagrams illustrating a coordination process of the driving component and the printer's driving head when the process cartridge of the photosensitive drum shown in FIG. 1 is disengaged from the printer.
Figure 21D:
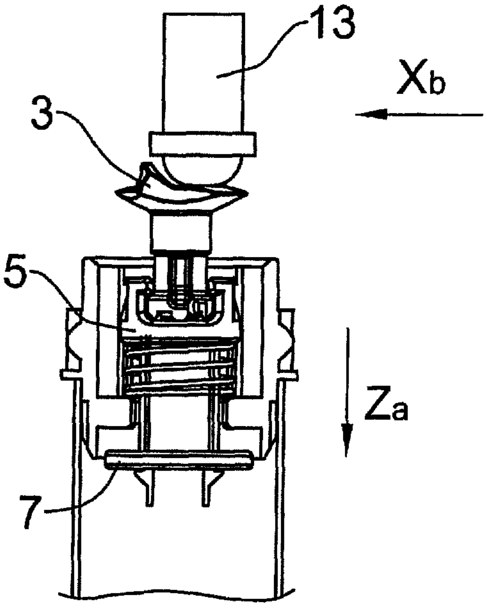
Figure 21B:
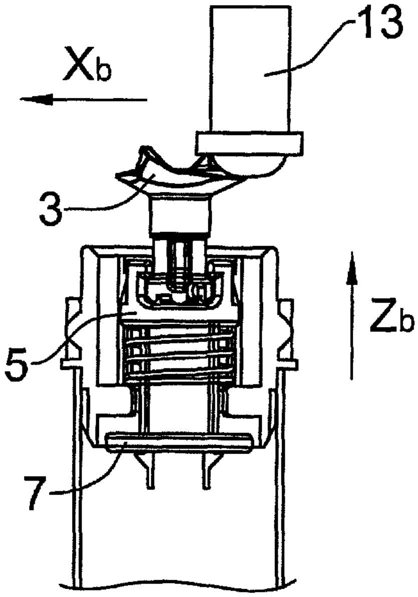
Figure 21C:
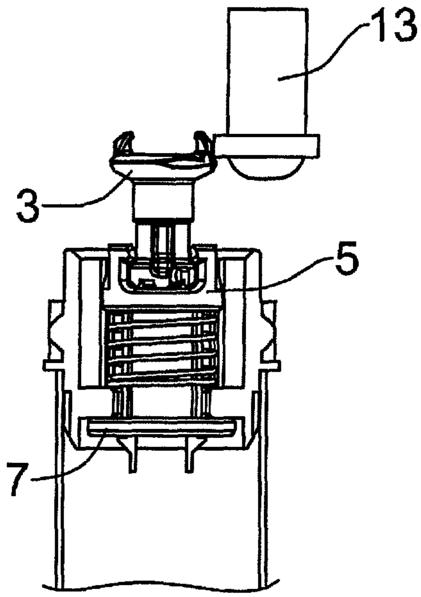

The first straight line reciprocally transitional movement acted by the regulating component 11 along the first direction X perpendicular to the gear’s longitudinal direction Z relative to the gear 2 can be more clearly understood through FIGS. 18*a*-18*c*. The movement is achieved inside the drum shaped hole 22 of the gear 2.

The longitudinal and reciprocally transitional movement acted by the regulating component 11 along the photosensitive drum’s longitudinal direction Z relative to the gear 2 via the compression of the spring 8 exerted by an external force can be more clearly understood through FIGS. 19*a*-19*c*.

FIGS. 20*a*-20*d* show schematic diagrams of a working process in which a process cartridge assembling the driving component 1 (only the end of the photosensitive drum is shown) is engaged into a printer. The process cartridge is engaged into the printer along the direction Xa perpendicular to the photosensitive drum’s axis. FIGS. 21*a*-21*d* show schematic diagrams of a working process in which the process cartridge assembling the driving component 1 is disengaged from the printer. The process cartridge is disengaged from the printer along the direction Xb perpendicular to the drum’s axis. The regulating component 11 inside the driving component 1 moves inward overall along the direction Za while the regulating component 11 moves outward overall along the direction Zb. Referring to FIG. 13, $\theta_a$ represents a clockwise rotary direction of the rotational driving force receiver 3 and $\theta_b$ represents a counterclockwise rotary direction of the rotational driving force receiver 3.

Its working process is described as follows:

1. Pushing a process cartridge into a printer along the direction Xa.

2. Referring to FIGS. 20*a*-20*d*, when the driving component 1 on the process cartridge is put into the printer along the direction Xa and contacts the printer's driving shaft 13, two cases are required to be illustrated separately.

1) If the initial contact position is the first convex claw 31, the printer's driving shaft 13 will touch the two bevels 311, 312 of the first convex claw 31. One of the two surfaces will inevitably receive a weak stress. When the second bevel 312 receives the weak stress, the printer's driving shaft 13 rubs against the second bevel 312 pushing the rotational driving force receiver 3 to rotate a certain angle along the direction $\theta_a$, and then the printer's driving shaft 13 can automatically be plunged into the second section 34 adjacent to the second bevel 312 causing the regulating component 11 in the driving component 1 to move overall along the direction Za. When the first bevel 311 receives the weak stress, the printer's driving shaft 13 rubs against the first bevel 311 pushing the rotational driving force receiver 3 to rotate a certain angle along the direction $\theta_b$, and then the printer's driving shaft 13 can automatically be plunged into the first section 33 adjacent to the first bevel 311 causing the regulating component 11 in the driving component 1 to move overall along the direction Za. Since the second convex claw 32 is centrally symmetric to the first convex claw 31, its movement process is similar as the above process when the initial contact position is the second convex claw 32.

2) If the initial contact position is the first section 33 or the second section 34, the printer's driving shaft 13 is automatically plunged into the first section 33 or the second section 34 causing the regulating component 11 to move overall along the direction Za.

3. The moving displacement of the regulating component 11 in the driving component 1 overall along the direction Za is increased gradually as the force in the direction Xa is increased. When the printer's driving shaft 13 contacts the spherical surface 35, the regulating component 11 in the driving component 1 moves overall along the direction Zb until the amount of the moving displacement becomes zero.

4. When the printer starts, the printer's driving shaft 13 is automatically coupled with the rotational driving force receiver 3, which receives the rotational driving force from the printer to drive the main drum body 9 of the photosensitive drum 10 to rotate.

5. When the rotational driving force receiver 3 receives the driving force from the printer, the driving force from the printer may not be a constant value. Through a variable value generated from the regulating component 11 in the driving component 1 being moved alternatively in a straight line within a small range to buffer the printer's driving force, the photosensitive drum can rotate smoothly not generating jump and undulation and the process cartridge can work normally having excellent printing quality.

6. Referring to FIGS. 21*a*-21*d*, when the process cartridge is taken out from the printer after it stops running, the process cartridge initially moves along the direction Xb and the printer's driving shaft 13 begins to be separated from the rotational driving force receiver 3.

7. When the printer's driving shaft 13 contacts the edge of the spherical surface 35, the regulating component 11 in the driving component 1 moves overall along the direction Za.

8. As the amount of the moving displacement of the regulating component 11 overall along the direction Za is increased, if the printer's driving shaft meets the first convex claw 31 or the second convex claw 32, the rotational driving force receiver 3 will be pushed to rotate an angle along the direction $\theta_a$ or $\theta_b$ causing the printer's driving shaft 13 to be plunged into the first section 33 or the second section 34.

9. When the printer's driving shaft 13 is plunged into the first section 33 or the second section 34, the regulating component 11 moves overall along the direction Zb and the process cartridge can not be taken out from the printer until the amount of the moving displacement becomes zero.

The above is only the optimal embodiment of the present invention. It should be pointed out that under the premise not deviating from the present inventive concept, one of ordinary skilled in the art can make many changes and modifications without deviating from the protection range of the present invention. For example, the position limit bottom can be achieved by adopting other longitudinal position limit structures that can be easily thought by one of ordinary skilled in the art. The longitudinal position limit structure can be an independent structure separated from the regulating rod or a part formed on the regulating rod. In addition, the spring support part can be substituted by the spring parts other than the helical compression spring, e.g., a compressible elastic plastic member. The shapes of the position limit hole on the gear's divisional plate are not limited to drum shape but can also be rectangular, parallel quadrilateral and any other shapes with two parallel lines as long as the regulating component can only make translational movement along the longitudinal and radial directions but not make rotation around the axis.

INDUSTRIAL APPLICABILITY

Since a regulating component of a driving component is provided within a gear and can be moved reciprocally and translationally along the gear's longitudinal direction and a first direction perpendicular to the longitudinal direction, in addition, a spring support part and a longitudinal position limit part are provided between the regulating component and the gear, a rotational driving force receiver of the regulating component always keeps consistent with the photosensitive drum's longitudinal direction under the spring support part's force when a process cartridge having the driving component is assembled inside a printer through a slide. And since a longitudinal position limit part is provided, the regulating component is not easily disengaged from the gear thus ensuring the work to be done reliably and stably. When contacting with the printer's driving shaft, the rotational driving force receiver employs its own bevels to rub against the spherical surface of the printer's driving shaft and the printer's driving shaft presses the rotational driving force receiver to move along the photosensitive drum's longitudinal direction. When the process cartridge is engaged in the working position inside a printer, the printer's driving shaft automatically aligns the rotational driving force receiver of the driving component. When a printer starts, the printer's driving shaft may rotate idle to an angle at the beginning and then is engaged with two convex claws of the rotational driving force receiver thus driving the rotation of the photosensitive drum in the process cartridge and letting the process cartridge powder to be developed. Thus, the printer's printing process is fulfilled. Therefore, compared to the existing technology, the driving component in the present invention is simple to be assembled, convenient, and stable in structure and performance. The process cartridge using this driving component has a smooth engagement with a printer, reliable performance and stable work.

What is claimed is:

1. A driving component comprising:

a gear having one fixed end; and a regulating component having a rotational driving force receiver outside the other end projecting from said gear, wherein, said regulating component is provided within said gear by being moved reciprocally and translationally along the longitudinal direction of said gear and a first direction perpendicular to the longitudinal direction relative to said gear; a spring support part and a longitudinal position limit part are provided between said regulating component and said gear; and said rotational driving force receiver is provided inside said regulating component by rotating around its own axis;

wherein, said regulating component comprises a motion subassembly and a regulating rod, said regulating rod having a chute, said motion subassembly is provided within said chute by being moved reciprocally and translationally along a second direction perpendicular to the longitudinal direction of said gear relative to said regulating rod, and said second direction intersects with the projection of said first direction on the same radial plane of said gear; and wherein, said motion subassembly comprises said rotational driving force receiver and a regulating slider, wherein said rotational driving force receiver is rotationally connected to said regulating slider around its axis and a rotation limiting pin is provided between said rotational driving force receiver and said regulating slider.

2. The driving component according to claim 1, wherein, the outer peripheral surface of said gear having a transmission tooth ring;

a divisional plate perpendicular to the longitudinal direction and a gear cavity above the divisional plate being provided inside said gear, wherein the center position of said divisional plate has opened a position limit hole, and a number of bars projecting longitudinally are uniformly distributed on the circumferential wall of the gear cavity;

said regulating rod comprising a top, a rod and a circlip, wherein said top has said chute penetrating in a radial direction and a position limit bottom is fixed on the circlip;

said position limit bottom being located inside of said divisional plate; said top being located outside of said divisional plate; and said rod passing through said position limit hole, wherein the width of said position limit hole is substantially equal to the width of the cross section of said rod and the length of said position limit hole is larger than the length of the cross section of said rod.

3. The driving component according to claim 1, wherein, the outer peripheral surface of said gear having a transmission tooth ring; a divisional plate perpendicular to the longitudinal direction and a gear cavity above the divisional plate being provided inside said gear, wherein the center position of said divisional plate has opened a position limit hole, and a number of bars projecting longitudinally are uniformly distributed on the circumferential wall of the gear cavity;

said regulating rod comprising a top, a rod and a circlip, wherein said top has said chute penetrating in a radial direction and a position limit bottom is fixed on the circlip;

said position limit bottom being located inside of said divisional plate; said top being located outside of said divisional plate; and said rod passing through said position limit hole, wherein the width of said position limit hole is substantially equal to the width of the cross section of said rod and the length of said position limit hole is larger than the length of the cross section of said rod.

4. The driving component according to claim 1, wherein, said rotational driving force receiver comprising an outer end portion, a middle portion and a shaft portion on which a pinhole allowing said rotation limiting pin to pass through is provided, wherein a concave spherical surface is formed at the center position of said outer end portion; a first convex claw and a second convex claw projecting longitudinally, and a first section and a second section separated by said first convex claw and said second convex claw are formed around the circumference of the spherical surface; and the surface of said first convex claw has a first engaged surface, a first bevel and a second bevel, the surface of said second convex claw has a second engaged surface, a third bevel and a fourth bevel, in which the first bevel, the second bevel, the third bevel and the fourth bevel are all formed around the circumferential edge of said outer end portion.

5. The driving component according to claim 4, wherein, the outer peripheral surface of said gear having a transmission tooth ring; a divisional plate perpendicular to the longitudinal direction and a gear cavity above the divisional plate being provided inside said gear, wherein the center position of said divisional plate has opened a position limit hole, and a number of bars projecting longitudinally are uniformly distributed on the circumferential wall of the gear cavity;

said regulating rod comprising a top, a rod and a circlip, wherein said top has said chute penetrating in a radial direction and a position limit bottom is fixed on the circlip;

said position limit bottom being located inside of said divisional plate; said top being located outside of said divisional plate; and said rod passing through said position limit hole, wherein the width of said position limit hole is substantially equal to the width of the cross section of said rod and the length of said position limit hole is larger than the length of the cross section of said rod.

6. The driving component according to claim 4, wherein, said first convex claw and said second convex claw, and said first section and said second section being centrally symmetric to the axis of said rotational driving force receiver, respectively.

7. The driving component according to claim 6, wherein, the outer peripheral surface of said gear having a transmission tooth ring; a divisional plate perpendicular to the longitudinal direction and a gear cavity above the divisional plate being provided inside said gear, wherein the center position of said divisional plate has opened a position limit hole, and a number of bars projecting longitudinally are uniformly distributed on the circumferential wall of the gear cavity;

said regulating rod comprising a top, a rod and a circlip, wherein said top has said chute penetrating in a radial direction and a position limit bottom is fixed on the circlip;

said position limit bottom being located inside of said divisional plate; said top being located outside of said divisional plate; and said rod passing through said position limit hole, wherein the width of said position limit hole is substantially equal to the width of the cross section of said rod and the length of said position limit hole is larger than the length of the cross section of said rod.

8. The driving component according to claim 6, wherein, said regulating slider comprising a base and a boss formed on the base, wherein a through hole penetrating longitudinally is provided inside the boss, the diameter of said through hole is larger than the diameter of the shaft portion of said rotational driving force receiver but smaller than the diameter of the middle portion of said rotational driving force receiver, a first side of said base has a first position limit protrusion protruding outward and a second side has a second position limit protrusion protruding outward, the bottom of said base has a recess accommodating said rotation limiting pin, the recess is formed around the circumference of said through hole, and a first position limit block and a second position limit block are provided oppositely inside the recess.

9. The driving component according to claim 8, wherein, the outer peripheral surface of said gear having a transmission tooth ring; a divisional plate perpendicular to the longitudinal direction and a gear cavity above the divisional plate being provided inside said gear, wherein the center position of said divisional plate has opened a position limit hole, and a number of bars projecting longitudinally are uniformly distributed on the circumferential wall of the gear cavity;

said regulating rod comprising a top, a rod and a circlip, wherein said top has said chute penetrating in a radial direction and a position limit bottom is fixed on the circlip;

said position limit bottom being located inside of said divisional plate; said top being located outside of said divisional plate; and said rod passing through said position limit hole, wherein the width of said position limit hole is substantially equal to the width of the cross section of said rod and the length of said position limit hole is larger than the length of the cross section of said rod.

10. A photosensitive drum, comprising:

a main drum body and a driving component fixed at a longitudinal end of said main drum body;

said driving component comprising a gear having one fixed end; and a regulating component having a rotational driving force receiver outside the other end projecting from said gear, wherein, said regulating component is provided within said gear by being moved reciprocally and translationally along the longitudinal direction of said gear and a first direction perpendicular to the longitudinal direction relative to said gear; a spring support part and a longitudinal position limit part are provided between said regulating component and said gear; and said rotational driving force receiver is provided inside said regulating component by rotating around its own axis;

wherein, said regulating component comprises a motion subassembly and a regulating rod, said regulating rod having a chute, said motion subassembly is provided within said chute by being moved reciprocally and translationally along a second direction perpendicular to the longitudinal direction of said gear relative to said regulating rod, and said second direction intersects with the projection of said first direction on the same radial plane of said gear; and wherein, said motion subassembly comprises said rotational driving force receiver and a regulating slider, wherein said rotational driving force receiver is rotationally connected to said regulating slider around its axis and a rotation limiting pin is provided between said rotational driving force receiver and said regulating slider.

11. The photosensitive drum according to claim 10, wherein, said rotational driving force receiver comprising an outer end portion, a middle portion and a shaft portion on which a pinhole allowing said rotation limiting pin to pass through is provided, wherein a concave spherical surface is formed at the center position of said outer end portion; a first convex claw and a second convex claw projecting longitudinally, and a first section and a second section separated by said first convex claw and said second convex claw are formed around the circumference of the spherical surface; and the surface of said first convex claw has a first engaged surface, a first bevel and a second bevel, the surface of said second convex claw has a second engaged surface, a third bevel and a fourth bevel, in which the first bevel, the second bevel, the third bevel and the fourth bevel are all formed around the circumferential edge of said outer end portion.

12. A process cartridge, comprising a cartridge; and a photosensitive drum assembled rotationally inside said cartridge, said photosensitive drum comprising a main drum body and a driving component fixed at a longitudinal end of said main drum body;

said driving component comprising a gear having one fixed end; and a regulating component having a rotational driving force receiver outside the other end projecting from said gear, wherein, said regulating component is provided within said gear by being moved reciprocally and translationally along the longitudinal direction of said gear and a first direction perpendicular to the longitudinal direction relative to said gear; a spring support part and a longitudinal position limit part are provided between said regulating component and said gear; and said rotational driving force receiver being provided inside said regulating component by rotating around its own axis, wherein, said regulating component comprises a motion subassembly and a regulating rod, said regulating rod having a chute, said motion subassembly is provided within said chute by being moved reciprocally and translationally along a second direction perpendicular to the longitudinal direction of said gear relative to said regulating rod, and said second direction intersects with the projection of said first direction on the same radial plane of said gear; and wherein, said motion subassembly comprises said rotational driving force receiver and a regulating slider, wherein said rotational driving force receiver is rotationally connected to said regulating slider around its axis and a rotation limiting pin is provided between said rotational driving force receiver and said regulating slider.

13. The process cartridge according to claim 12, wherein, said rotational driving force receiver comprising an outer end portion, a middle portion and a shaft portion on which a pinhole allowing said rotation limiting pin to pass through is provided, wherein a concave spherical surface is formed at the center position of said outer end portion; a first convex claw and a second convex claw projecting longitudinally, and a first section and a second section separated by said first convex claw and said second convex claw are formed around the circumference of the spherical surface; and the surface of said first convex claw has a first engaged surface, a first bevel and a second bevel, the surface of said second convex claw has a second engaged surface, a third bevel and a fourth bevel, in which the first bevel, the second bevel, the third bevel and the fourth bevel are all formed around the circumferential edge of said outer end portion.

* * * * *